Sept. 5, 1944.   R. C. MORRIS ET AL   2,357,344
SOLVENT EXTRACTION PROCESS
Filed June 15, 1943
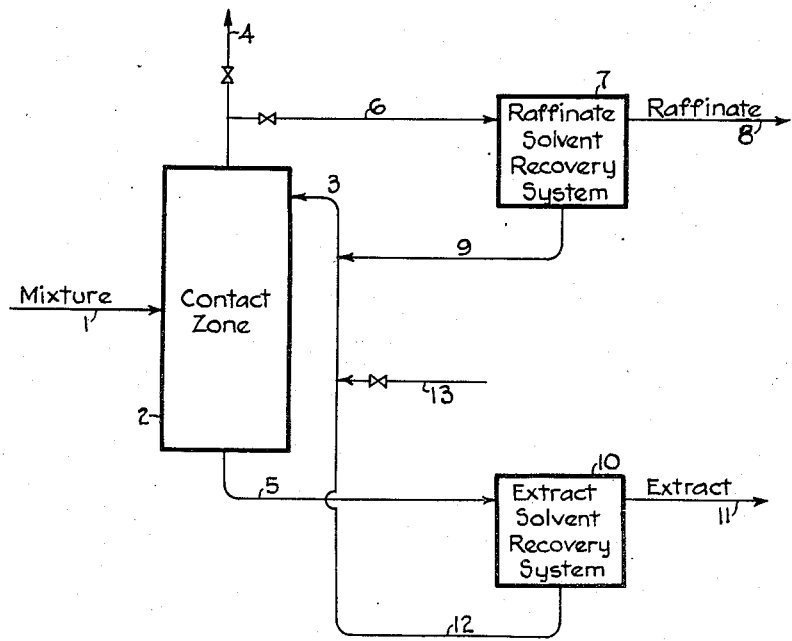
Inventors: Rupert C. Morris
   Theodore W. Evans
By their Attorney:

Patented Sept. 5, 1944

2,357,344

UNITED STATES PATENT OFFICE 2,357,344

SOLVENT EXTRACTION PROCESS

Rupert C. Morris, Berkeley, and Theodore W. Evans, Oakland, Calif., assignors to Shell Development Company, San Francisco, Calif., a corporation of Delaware Application June 15, 1943, Serial No. 490,932

24 Claims. (Cl. 196—13)

This invention relates to a process for separating mixtures of two or more compounds by extraction with a selective solvent comprising a 2-sulfolene. The compound 2-sulfolene has the formula:

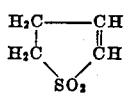

Its derivatives are compounds wherein one or more of the hydrogen atoms is replaced by an organic radical which may contain a polar grouping and more specifically may contain oxygen, nitrogen, sulfur and/or halide atoms. In hydrocarbon-substituted 2-sulfolenes the hydrocarbon radicals may be aliphatic, alicyclic, aromatic or mixed. 2-sulfolene derivatives containing oxygen include hydroxy 2-sulfolenes, 2-sulfolenyl-ethers, -aldehydes, -ketones, -acids and -esters; 2-sulfolene derivatives containing nitrogen include 2-sulfolenyl-amines, -nitriles and nitro 2-sulfolenes; 2-sulfolene derivatives containing sulfur include 2-sulfolenyl sulfides, -sulfoxides and -sulfones. Other 2-sulfolene derivatives may contain halide radicals, inorganic esters or mixed radicals of those above mentioned, such as acid amides, halohydrins, sulfonamides, etc. To meet stability requirements, these organic substitution radicals should contain not more than one olefinic double bond and preferably none. Derivatives may be made by condensing a conjugated diolefin or substituted conjugated diolefin with sulfur dioxide, and then subjecting the resultant product to isomerization, usually by the influence of an alkaline catalyst. The formed 2-sulfolene may be modified by alkylation, hydration, amination, chlorination, nitration and/or other substitution or addition reactions.

Previously, certain aliphatic sulfones such as dipropyl sulfone and dibutyl sulfone have been employed in the separation of naphthenic hydrocarbons from paraffinic hydrocarbons by liquid-liquid extraction, but it has now been discovered that the 2-sulfolenes (which are heterocyclic sulfones) have superior selectivity and a much wider application than the aliphatic sulfones. 2-sulfolenes are highly effective in both liquid-liquid and vapor-liquid extraction processes and for the separation of many different types of mixtures other than hydrocarbon mixtures, as will be described later.

It is the broad purpose of this invention to separate mixtures of different compounds economically, efficiently and effectively by solvent extraction. Specific purposes are, among others, to produce pure compounds, desulfurize and increase the viscosity index of hydrocarbon mixtures, dehydrate wet compounds, separate components of constant boiling mixtures or of mixtures having boiling points closer than, say, 10° C., or of isomeric mixtures, or mixtures of similar organic compounds having different degrees of saturation, or of other mixtures otherwise difficulty separable.

Generally, the process of this invention comprises the steps of (A) contacting the mixture to be separated either in the liquid or the vapor state with a liquid selective solvent to produce a raffinate phase and an extract phase, (B) separating the two phases from each other, and (C) removing the solvent from at least one of said phases to produce a raffinate and/or an extract and, usually, also recovering the solvent removed for further contact with more of said mixture. These steps, common to all solvent extraction processes, both liquid-liquid and vapor-liquid (including extractive distillation), may be carried out in any suitable manner known to those skilled in the art.

Many different types of mixtures of compounds may be separated by the selective solvents of this invention, provided the mixtures are inert toward the solvent, and the presence of the solvent in the mixture causes a greater change in the "escaping tendency" of one component of the mixture relative to that of other components. By "escaping tendency" is meant the potential of one component to pass from one phase to another. Thus the selective solvents of this invention are effective for the isolation of pure compounds, the separation of isomers, various purification processes, such as desulfurization and dehydration, the separation of mixtures forming azeotropes, or the separation of mixtures of organic compounds of different degrees of saturation, for instance to concentrate different types of hydrocarbons in different fractions, examples being the separation of one or more of the following: aromatics, polyolefins, olefins, naphthenes, and/or paraffins from various hydrocarbon mixtures containing them.

Some specific examples of mixtures which may be separated by the selective solvents of this invention are hydrocarbon mixtures such as ethane and ethylene; propane and propylene; butane, isobutane, alpha-, beta- and iso-butylenes, butadiene, vinyl acetylene, ethyl acetylene; pentanes, pentenes, isoprene and piperylene; hexanes and hexenes; gasoline distillates containing benzene, toluene, xylenes, ethyl benzene, mesitylene, cumene, etc.; ortho and para-xylene; naphthenes and paraffins, gasoline, kerosene, fuel oils, lubricating oils, etc.; halogenated hydrocarbons including ortho and para chloronitrobenzene; etc. Other mixtures which may be separated are those of organic substances containing water, such as aqueous alcohols including methyl, ethyl, propyl, etc., alcohols; glycols; glycerines; chlorhydrins; organic acids including acetic, propionic, lactic, etc., acids; esters including isopropyl acetate; etc. Still other mixtures are those of oxy organic compounds such as ortho and para-nitrophenol; ortho and para-methoxy phenol; ortho and para-dihydroxy benzene; glycol chlorhydrin and glycol; glycol and glycol ethers; ethyl acetate and ethyl alcohol; nitroglycerine and glycerine; primary and secondary butyl alcohols; alkyl phenols such as ortho, meta and para-cresols; ortho and para-hydroxy benzaldehyde; ortho and para-ethoxy aniline; ortho and para-vanillin; methyl propyl ketone and diethyl ketone; mixtures of resorcin, pyrocatechine and hydroquinone; terpenes or sesqui-terpenes from oxygen-containing compounds such as alcohols or aldehydes present therein; etc. Other organic mixtures are those produced in various chemical industrial processes of the coal, lignite and petroleum industries such as organic sulfur compounds, including mercaptans, mixtures of phenols and thiophenols; mixtures of nitrogen bases, mixtures of nitrogen bases and other organic compounds including petroleum; essential oils; fatty oils, including glyceride oils, such as linseed, soya bean, fish, perilla, cottonseed, etc.; tall oil; mono- di- and tri-methylamines; isoprene and methyl formate; isophorone and xylidine; isophorone and xylenol; organic acids such as methyl succinic acid and glutaric acid; various fatty acids, including stearic, oleic, linoleic, etc., acids; rosins and various synthetic resins; propane-1-1-dicarboxylic acid and propane-1-3-dicarboxylic acid; ortho and para cetyl benzol sulfonic acid; etc.

It may be noted that all the above mixtures are of a type which are at least partially soluble in the commonly known selective solvents which have preferential solvent power for aromatic over paraffinic hydrocarbons.

The 2-sulfolenes of this invention may be employed as selective solvents by themselves singly or as mixtures of two or more; or in aqueous solutions; or together with auxiliary commonly known selective solvents or anti-solvents, provided they do not react with the particular 2-sulfolene employed and are stable under the temperature conditions of the process.

The 2-sulfolene should not crystallize out of solution at the highest concentration which may occur at any point in the process and at a temperature above about 150° C. It is desirable that it melt at a temperature not greater than 150° C. and preferably below 100° C., and it is further desirable that it be not more than 50% by weight soluble at room temperature in kerosene having a Watson characterization factor of at least 12 (see Industrial and Engineering Chemistry, vol. 27, page 1460, December 1935, "Characterizations of petroleum fractions," by K M. Watson, E. F. Nelson and George B. Murphy). Higher solubility in such a kerosene frequently is an indication of poor selectivity.

Some suitable specific 2-sulfolenes are: 2-sulfolene, hydrocarbon-substituted 2-sulfolenes such as aliphatic, alicyclic, aromatic or mixed sulfolenes, preferably containing not more than one olefinic double bond per radical, if any, and not more than about 14 carbon atoms, such as: 2-, 3-, 4-, or 5- methyl-, ethyl-, vinyl-, propyl-, isopropyl-, propenyl-, allyl-, isopropenyl-, butyl-, isobutyl-, butenyl-, isobutenyl-, amyl-, isoamyl-, pentenyl-, cyclobutyl-, cyclopentyl-, cyclopentenyl-, cyclohexyl-, cyclohexenyl-, phenyl-, benzyl-, tolyl-, xylyl-, styryl-, etc., 2-sulfolenes; 2-methyl, ethyl-, propyl-, butyl-, phenyl-, etc., 3-, 4-, or 5- methyl-, ethyl-, propyl-, etc., 2-sulfolenes; 3-methyl-, ethyl-, propyl-, butyl-, etc., 4- or 5- methyl-, ethyl-, propyl-, or butyl-, etc., 2-sulfolenes; 4- methyl-, ethyl-, propyl-, butyl-, etc., 5-methyl-, ethyl-, propyl-, butyl-, etc., 2-sulfolenes; 4,4- or 5,5- dimethyl-, diethyl-, dipropyl-, dibutyl-, etc., 2-sulfolenes; 2- methyl-, ethyl-, propyl-, butyl-, etc., 3- methyl-, ethyl-, propyl-, butyl-, etc., 4- or 5- methyl-, ethyl-, propyl-, butyl-, etc., 2-sulfolenes; 4- methyl-, ethyl-, propyl-, butyl-, etc., 5- methyl-, ethyl-, propyl-, butyl-, etc., 2- or 3- methyl-, ethyl-, propyl-, or butyl-, etc., 2-sulfolenes; 4,4- methyl-, ethyl-, propyl-, butyl-, etc., 2-, 3-, or 5- methyl-, ethyl-, propyl-, butyl-, etc., 2-sulfolenes; 5,5- methyl, ethyl-, propyl-, butyl-, etc., 2-, 3-, or 4- methyl-, ethyl-, propyl-, butyl-, etc., 2-sulfolenes; 2,3,4,5- or 4,4,5,5- methyl-, ethyl-, propyl-, butyl-, phenyl-, etc., 2-sulfolenes; etc.

Some suitable specific 2-sulfolenes substituted with organic radicals containing oxygen, nitrogen and sulfur are; hydroxy 2-sulfolenes such as 3-hydroxy-4-sulfolene, 2-hydroxy-4-sulfolene, 3-methyl-4-hydroxy-2-sulfolene, 4,5 - dihydroxy-2-sulfolene, etc.; sulfolenyl ethers such as methyl-, ethyl-, propyl-, allyl-, butyl-, isobutyl-, butenyl, methyl vinyl carbinyl-, amyl-, tetrahydrofurfuryl-, glycerol $\alpha\gamma$ -diallyl $\beta$-; octyl-, nonyl, 3,3,5- tetramethylcyclohexyl-, etc., $\Delta^2$ -4- or -5- sulfolenyl ethers and corresponding 4,5-diethers, etc.; 2-sulfolenyl esters; sulfolenyl amines such as $\Delta^2$ -4- sulfolenyl amine, N-methyl-, N-ethyl-, N-N-dimethyl-, N-butyl-, N-octyl-, etc., -4- sulfolenyl amines; sulfolenyl sulfides such as ethyl-, tertiary butyl-, isobutyl-, butenyl-, etc., $\Delta^2$ -4- or -5- sulfolenyl sulfides; sulfolenyl sulfones; sulfolenyl halides such as 3-chloro-, 3,4-dichloro-, 3-chloro-4-methyl-, etc., 2-sulfolenes; and mixed 2-sulfolenes, etc.

While the 2-sulfolenes, as previously indicated, may contain from 5 to 14 carbon atoms, it is in general preferred that the total number of carbon atoms in the organic radicals attached to the sulfolene ring range from 1 to 4, i. e. the 2-sulfolenes contain 5 to 8 carbon atoms.

The above 2-sulfolenes have the advantage as against many of the now commercially employed solvents such as liquid $SO_2$, furfural, phenol, nitrobenzene, aniline, etc., of relatively high thermal stability, and chemical inertness. For example, liquid $SO_2$, phenol and others will react with diolefins. Aniline will react with acids. Nitrobenzene will react with mercaptans. Furfural will polymerize and/or decompose in the presence of mere traces of acids or bases. In contrast, the 2-sulfolenes are unreactive in all of the above cases.

Of the 2-sulfolenes useful in this invention, some are more heat-stable than others; thus, in particular, the halogen, amine, acid, some aldehyde, and some ester derivatives are relatively heat-unstable. Some may begin to decompose at temperatures as low as 150° C. Other 2-sulfolenes, on the other hand, are extremely heat-stable even at temperatures as high as 300° C.

Some commonly known solvents, selective solvents and/or modifying agents which may be employed in conjunction with the 2-sulfolenes include: water, various mono- and poly-hydric alcohols such as methanol, ethanol, propanol, furfuryl alcohol, benzyl alcohol, glycols, glycerols, etc.; various ketones such as acetone, methyl ethyl ketone, diethyl ketone, cyclopentanone, benzophenone, phenyl tolyl ketone, diphenylene ketone, etc.; various aldehydes such as crotonaldehyde, acrolein, furfural, etc.; ethers such as ethylene glycol and diethylene glycol mono-alkyl ethers, mono- and di-glyceryl ethers, glyceryl diethers, chlorinated dialkyl ethers (e. g. beta-beta'-dichlorethyl ether), dioxane, etc.; lower aliphatic acids such as formic, acetic, propionic acids, acetic anhydride, etc.; esters such as benzoic, phthalic acid esters, etc.; phenol, cresylic acids, alkyl phenol mixtures, naphthols, alkyl naphthols, etc.; liquid ammonia, various organic amines such as lower aliphatic primary amines having one to eight carbon atoms, aniline, alkyl anilines, morpholine, diphenyl amine, ditolylamine, etc.; various nitriles such as acetonitrile, propionitrile, lactonitrile, butyronitrile, benzonitrile, etc.; various nitro hydrocarbons such as nitromethane, nitroethane, nitrobenzene, nitrotoluene, nitroxylenes, etc.; various pyridines and quinolines; liquid sulfur dioxide; various aromatic hydrocarbons such as benzene, toluene, naphthalene, etc.; and various sulfoxides and various sulfolanes such as those which correspond with the above-mentioned 2-sulfolenes; various modifying salts such as those disclosed in U. S. Patent No. 2,246,257 to Kohn; and the like.

The 2-sulfolene or the mixture of 2-sulfolene with an auxiliary solvent must be at least partially miscible with the mixture to be separated under the conditions of the process.

Furthermore, anti-solvents may be employed together with the 2-sulfolenes such as are employed in the DuoSol process for the extraction of lubricating oils. Some such anti-solvents include propane, butane, pentane, n-hexane; paraffinic gasoline, kerosene, gas oil, lubricating oil, various ethers, trichlorethylene, carbon tetrachloride, etc. Still further, compounds of two or more solvents together with one or more anti-solvents may also be employed.

The amount of auxiliary or anti-solvents which may be employed in conjunction with the 2-sulfolenes to make up the solvent may vary between 0% and 90% by volume, preferably less than 50% by volume, of the solvent.

In determining whether a liquid-liquid or vapor-liquid extraction should be employed in any given case, both the nature of the mixture and that of the 2-sulfolene must be considered. As to the mixtures, those having high viscosities and high boiling points, or those chemically or physically unstable at high temperatures, or those which react with the solvent at high temperatures, should be extracted while in the liquid state. As to the 2-sulfolenes, those containing polar substitution radicals are in general less heat-stable than the hydrocarbon 2-sulfolenes. Therefore it is preferable in general to employ the former in low temperature extraction processes only.

In liquid-liquid solvent extraction the temperature generally may range within wide limits, provided it is above the melting temperature of the solvent and below the boiling temperature of both the mixture and the solvent under the pressure conditions of operation of the process. For example, if a very volatile mixture is being separated, a relatively high pressure and/or low temperature are required, while if a very viscous and high boiling mixture is being separated, higher temperature and lower pressure are normally more advantageous. Thus, the temperature may range between about $-50°$ C. and about $+300°$ C. and the pressure between about atmospheric and 500 pounds p. s. i.

In vapor-liquid solvent extraction such as extractive distillation the general temperature range, though wide, is higher for the same mixtures than in liquid-liquid extraction. It is above the bubble temperature of the mixture and below the boiling temperature of the solvent under the pressure maintained in the process. If a normally gaseous mixture is separated by extractive distillation, a relatively low temperature may be employed, while if a normally liquid mixture is separated by the same process a higher temperature is usually required. Subatmospheric pressure may be resorted to in order to reduce the temperature if the mixture is thermally unstable at higher temperatures. Suitable temperatures may range from above about $-50°$ C. or the bubble temperature of the mixture (whichever is higher), up to about $+350°$ C., at pressures from about .1 pound p. s. i. absolute up to about 500 pounds p. s. i. or higher.

Useful solvent-to-mixture ratios may range from about ½ to 20 by volume, preferably not more than 10.

The accompanying drawing is a general flow diagram of a solvent extraction process.

A mixture to be separated is introduced in either the liquid or the vapor state through line 1 into contact zone 2 and admixed with a 2-sulfolene introduced into the same zone through a separate line 3. This is the first step (A) in all solvent extraction processes and may comprise either a bubble plate mixer, an impinging jet mixer, an agitation vessel, a plate column, or a packed tower.

In the contacting zone the mixture and 2-sulfolene are caused to produce a raffinate phase and an extract phase which are separately withdrawn respectively through lines 4 and 5. This is the second step (B) of all solvent extraction processes, namely the separation of two phases produced in the contacting zone, and may be effected by distillation, settling, decantation, or centrifuging.

The third step (C) (common to all solvent extraction processes) comprises the recovery of 2-sulfolene from one or both phases. In vapor-liquid extraction processes the raffinate phase may be substantially free of 2-sulfolene and may be withdrawn directly through line 4; but if enough solvent is present to warrant its recovery the raffinate phase is passed through line 6 into the raffinate solvent recovery system 7 to produce a solvent-free raffinate, which is withdrawn through line 8, and recovered 2-sulfolene which is withdrawn through line 9 and preferably joined to line 3 of 2-sulfolene entering contact zone 2. This recovery system may comprise a crystallization chamber distillation column, or a washing column. If the 2-sulfolene is washed from the raffinate phase (such as with water if a low molecular weight 2-sulfolene is employed) an additional step for its recovery is necessary, such as distillation, to separate the 2-sulfolene from the wash solvent.

The extract phase is introduced into a solvent recovery system 10, which is similar to recovery system 7. From recovery system 10 a solvent-free extract is withdrawn through line 11 and the recovered 2-sulfolene is withdrawn through line 12 and joined to line 3 for recontact with more of the mixture in contact zone 2. Fresh 2-sulfolene may be added to the system from time to time through line 13 as required.

The following are examples of the effectiveness of the solvents of this invention on the separation of different mixtures.

Example I

A petroleum distillate having a boiling range of between 90° C. and 115° C. and containing 4.98% by weight of mercaptans calculated as amyl mercaptans, was admixed at room temperature with an equal volume of 2,4-dimethyl-4-sulfolene. Two liquid phases were produced which were separated and analyzed for mercaptans. The raffinate phase contained 2.72% by weight mercaptans and the extract phase contained 2.16% mercaptans, about 44% of the total mercaptans being removed in a single stage liquid-liquid extraction.

Example II

A mixture of toluene (boiling point, 110.6° C.) and paraffins having about the same boiling range as toluene was admixed in a vessel with 50% by weight of 2,4-dimethyl-4-sulfolene. The mixture was then heated until the vapor above the liquid was in equilibrium with the liquid, and a sample of the vapor was separated and condensed. The 2,4-dimethyl-4-sulfolene was then removed from the resulting liquid and condensate by water washing, and the sulfolene-free phases were found to contain 58.7% and 38.2% toluene, respectively. From these data the volatility ratio of toluene to paraffin in the presence of 2,4-dimethyl-4-sulfolene was calculated to be 2.31. The volatility ratio, often called the alpha value, is the ratio of the per cent of paraffins in the vapor to the per cent of paraffins in the liquid, divided by the ratio of the per cent of toluene in the vapor to the per cent of toluene in the liquid.

We claim as our invention:

1. In a solvent extraction process for separating a mixture of different organic compounds the steps comprising contacting said mixture with a 2-sulfolene which is liquid and stable at the temperature of contacting to produce an extract phase and a raffinate phase, and separating said phases.

2. The process of claim 1 wherein the mixture is a petroleum fraction.

3. The process of claim 1 wherein the mixture consists of hydrocarbons of different degrees of saturation.

4. The process of claim 1 wherein the mixture is a toluene concentrate.

5. The process of claim 1 wherein the mixture consists essentially of $C_4$ hydrocarbons containing olefins and diolefins.

6. The process of claim 1 wherein the mixture consists essentially of $C_5$ hydrocarbons containing olefins and diolefins.

7. The process of claim 1 wherein said 2-sulfolene has a melting temperature less than 150° C.

8. The process of claim 1 wherein said 2-sulfolene at room temperature is less than 50% by weight soluble in kerosene having a Watson characterization factor of at least 12.

9. The process of claim 1 wherein said 2-sulfolene is unsubstituted 2-sulfolene.

10. The process of claim 1 wherein said 2-sulfolene contains between 4 and 14 carbon atoms.

11. The process of claim 1 wherein said 2-sulfolene is a hydrocarbon substituted 2-sulfolene containing from 5 to 8 carbon atoms.

12. The process of claim 1 wherein said 2-sulfolene is 2,4-dimethyl-4-sulfolene.

13. The process of claim 1 wherein said 2-sulfolene is 3-methyl-2-sulfolene.

14. The process of claim 1 wherein said 2-sulfolene is a substituted 2-sulfolene, the radicals comprising an element selected from the group consisting of H, C, O, N, S and halogens.

15. In a solvent extraction process for separating a mixture of different organic compounds, the steps comprising contacting said mixture with a 2-sulfolene which is liquid and stable at the temperature of contacting to produce an extract phase and a raffinate phase, separating said phases, recovering said 2-sulfolene and returning the recovered 2-sulfolene for further contact with more of said mixture.

16. In a solvent extraction process for separating a mixture of organic compounds, the steps comprising contacting said mixture with a selective solvent to produce two phases and separating said phases, said selective solvent comprising not less than 10% by volume of a 2-sulfolene which is liquid and stable at the temperature of contacting.

17. The process of claim 16 wherein the solvent comprises more than 50% by volume of said 2-sulfolene.

18. The process of claim 16 wherein the solvent-mixture ratio rangs between ½ and 20 by volume.

19. In a solvent extraction process for the separation of a liquid mixture of different organic compounds, the steps comprising contacting said mixture with a 2-sulfolene which is liquid and stable at the temperature of contacting to produce an extract phase and a raffinate phase and separating said phases, said temperature of contacting being above the melting temperature of said 2-sulfolene and below the boiling temperatures of said mixture and said 2-sulfolene.

20. In a solvent extraction process for separating a vaporizable liquid mixture of organic compounds, the steps comprising contacting said mixture with a 2-sulfolene which has a higher boiling temperature than that of said mixture and which is stable at the temperature of contacting to produce an extract phase and a raffinate phase, separating said phases and recovering said 2-sulfolene from at least one of said phases, said temperature of contacting being above the bubble temperature of said mixture and below the boiling temperature of said 2-sulfolene.

21. In an extractive distillation process for dehydrating a vaporizable aqueous organic mixture, the steps comprising contacting said mixture in the vapor state with a liquid hydrocarbon substituted 2-sulfolene having 5 to 14 carbon atoms at a temperature above the bubble temperature of said mixture and below the boiling temperature of said 2-sulfolene to produce two phases, and separating said phases.

22. In a solvent-extraction process for desulfurizing an organic petroleum oil, the steps comprising contacting said oil with a liquid hydrocarbon substituted 2-sulfolene having from 5 to 14 carbon atoms to produce two phases, and separating said phases.

23. In a solvent extraction process for separat a hydrocarbon mixture comprising aromatic and non-aromatic hydrocarbons, the steps comprising contacting said mixture with a 2-sulfolene which is liquid and stable at the temperature of contacting to produce an extract phase rich is aromatics and a raffinate phase rich in non-aromatics, and separating said phases.

24. The process of claim 1 wherein said mixture is an azeotrope.

RUPERT C. MORRIS.
THEODORE W. EVANS.